(No Model.)
J. B. ARMSTRONG.
TREATMENT OF COTTON SEED OIL.
No. 318,410. Patented May 19, 1885.
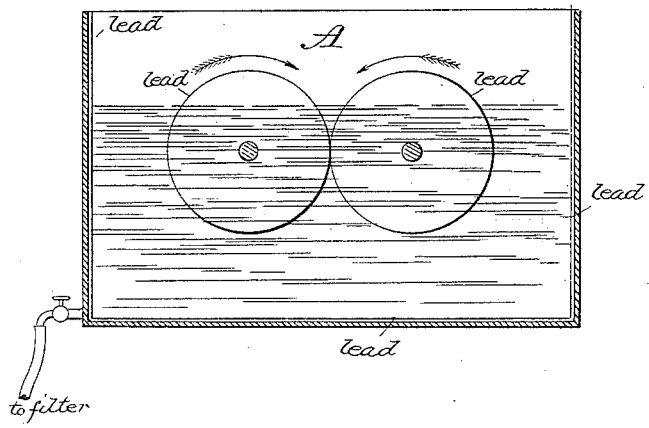

UNITED STATES PATENT OFFICE.

JOHN B. ARMSTRONG, OF CHICAGO, ILLINOIS, ASSIGNOR OF ONE-HALF TO SOLOMON PORTER BROCKWAY, OF SAME PLACE.

TREATMENT OF COTTON-SEED OIL.

SPECIFICATION forming part of Letters Patent No. 318,410, dated May 19, 1885.

Application filed September 1, 1884. (No model.)

*To all whom it may concern:*

Be it known that I, JOHN B. ARMSTRONG, of Chicago, in the county of Cook and State of Illinois, have invented a new and useful Improvement in the Treatment of Cotton-Seed Oil; and I do hereby declare that the following is full, clear, and exact description of the same.

My invention relates to the treatment of cotton-seed oil for the purpose of removing the gummy and coloring matter and rendering the oil fit for lubrication.

My invention consists in dissolving in the oil a proportion of oxide of lead. This process is carried on preferably in the manner hereinafter explained, and by the aid of an apparatus shown in the accompanying drawing, in which the figure represents a longitudinal section of the tank, taken across the axis of the wheels, showing the wheels in side elevation.

I apply the oil to the lead by exposing the oil to the surface of the lead at a temperature not above 100° Fahrenheit, and I may thus expose the oil to the surface of the lead in any convenient way. The contact of the oil with the lead causes the oil to dissolve a portion of the lead, which when in solution combines chemically with the gluten of the oil, and thus precipitates the gluten. The coloring-matter, from want of a base, is destroyed, as are all vegetable coloring substances on exposure.

The apparatus illustrated in the drawing is a convenient one to carry out my process. It consists of a tank, A, lined with sheet-lead, and in the tank are two wheels covered with sheet-lead, mounted upon axles having their bearings in the side of the tank and adapted to revolve in opposite directions and with their peripheries in contact. Thereby the oil is ground or rubbed between the surfaces and more rapidly changed. After the oil has been thus treated it is passed through a filter composed of animal charcoal and coke, or permitted to precipitate, which will remove all particles of gluten floating in the oil, leaving a clear straw-colored and afterward white or colorless fluid having all the qualities of other lubricators.

I claim as my invention—

1. The process of treating oil, consisting in causing a wheel or wheels covered with lead to revolve in contact with the oil, substantially as described.

2. The process of treating cotton-seed oil, consisting in dissolving in said oil the proportion of oxide of lead and then filtering the oil through a filter of animal charcoal and coke, substantially as described.

In testimony whereof I have signed my name to this specification in the presence of two subscribing witnesses.

J. B. ARMSTRONG.

Witnesses:
   MINNIE SCHEIDEMAN,
   Mrs. L. F. BROCKWAY.